(No Model.) 4 Sheets—Sheet 1.
E. J. HOUSTON.
UNDERGROUND CONDUIT FOR ELECTRIC CONDUCTORS.
No. 308,612. Patented Dec. 2, 1884.
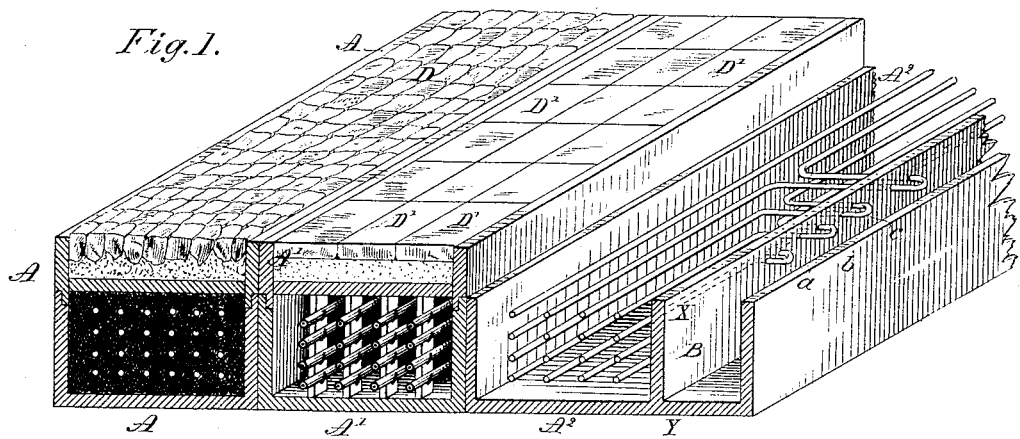
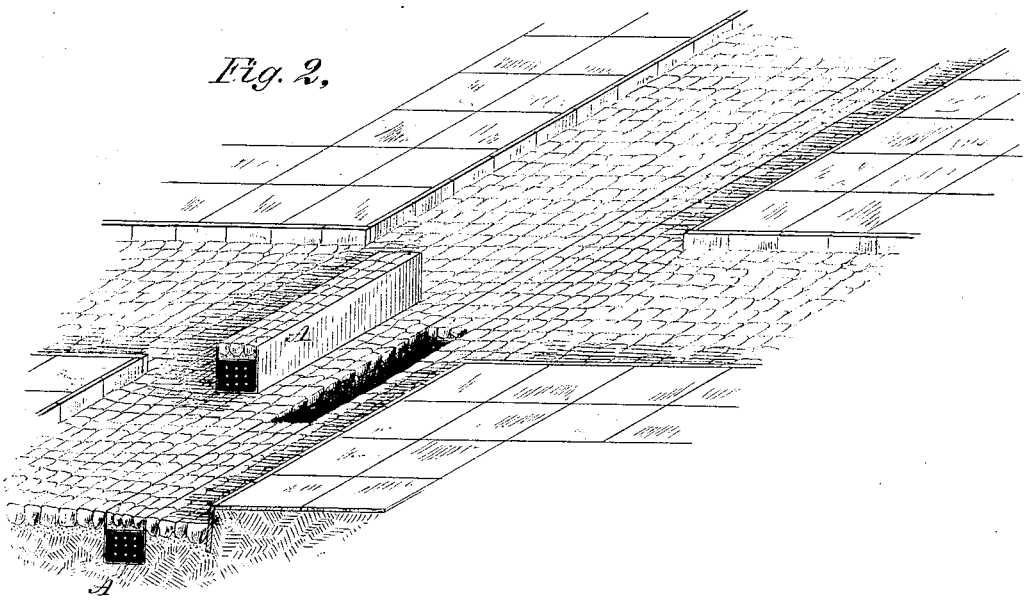

(No Model.)  4 Sheets—Sheet 2.
E. J. HOUSTON.
UNDERGROUND CONDUIT FOR ELECTRIC CONDUCTORS.
No. 308,612. Patented Dec. 2, 1884.
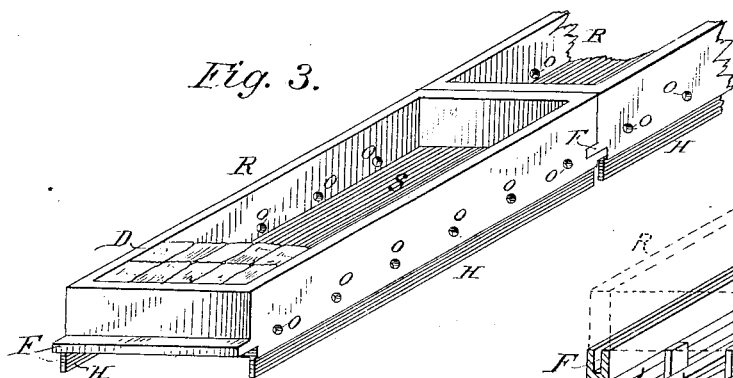
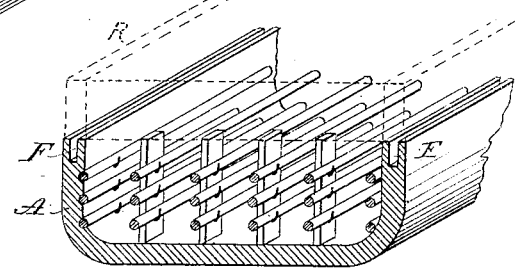
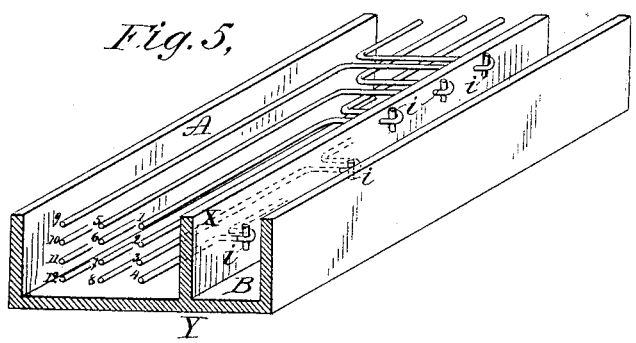
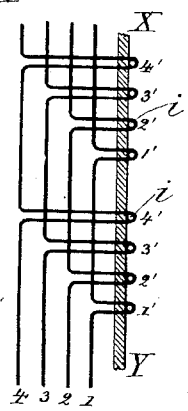
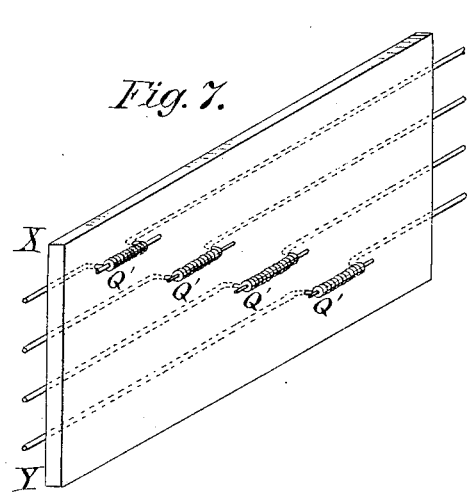
WITNESSES
Ernest Abshagen
Thos. Toomey
INVENTOR
E. J. Houston
By his Atty. H. C. Townsend (No Model.)  4 Sheets—Sheet 3.

E. J. HOUSTON.
UNDERGROUND CONDUIT FOR ELECTRIC CONDUCTORS.

No. 308,612.  Patented Dec. 2, 1884.

WITNESSES:  INVENTOR:

(No Model.)  4 Sheets—Sheet 4.
E. J. HOUSTON.
UNDERGROUND CONDUIT FOR ELECTRIC CONDUCTORS.
No. 308,612. Patented Dec. 2, 1884.
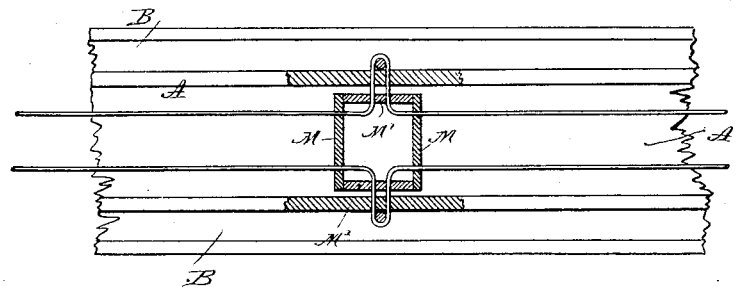
Fig. II.
Witnesses: Inventor:
Ernest Afshagen Edwin J. Houston
Thos. Dooney By his Attorney H. C. Townsend

UNITED STATES PATENT OFFICE.

EDWIN J. HOUSTON, OF PHILADELPHIA, PENNSYLVANIA, ASSIGNOR TO THE THOMSON-HOUSTON ELECTRIC COMPANY, OF NEW BRITAIN, CONN.

UNDERGROUND CONDUIT FOR ELECTRIC CONDUCTORS.

SPECIFICATION forming part of Letters Patent No. 308,612, dated December 2, 1884.

Application filed December 30, 1882. (No model.)

*To all whom it may concern:*

Be it known that I, EDWIN J. HOUSTON, a citizen of the United States, and a resident of Philadelphia, in the county of Philadelphia and State of Pennsylvania, have invented certain new and useful Improvements in Underground Conduits for Electric Conductors, of which the following is a specification.

In any system of underground conduits for electric conductors it is manifestly advantageous to insure ease in laying the conduit in the first instance, and to maintain a ready accessibility to it thereafter, for the purpose of laying the electrical conductors or for repairing or replacing them.

It is primarily the object of my invention to obtain these advantages in conduits for underground conductors.

In the second place, my invention has for its object such a construction of underground cable or conductor for electrical currents as will obviate the necessity for maintaining the conduit free from moisture.

The second object of my invention is necessarily connected with the first, since it enables me to place the conduits for the wires in such positions and under such circumstances as would otherwise be impracticable.

Finally, my invention involves novel methods of so protecting the leading wires or conductors as to more effectually secure them against the effects of the moisture and other corrosive agencies to which they will necessarily be exposed when placed in conduits constructed according to the principles of my invention.

Figure 8:
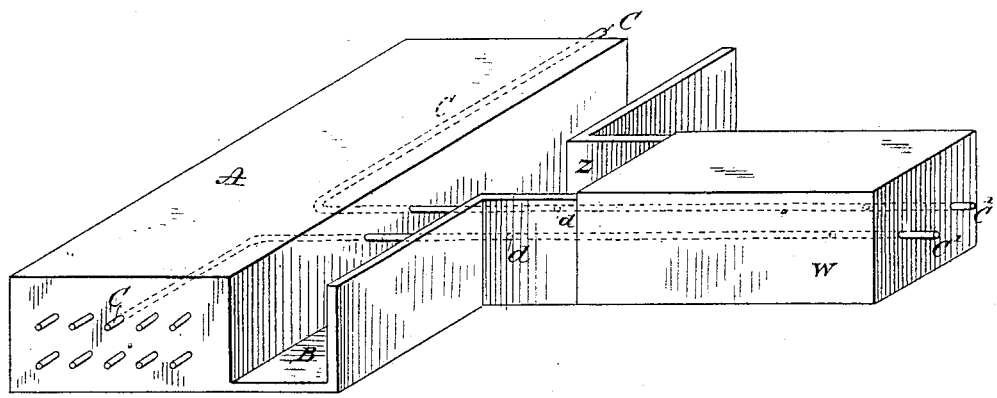
Figure 9:
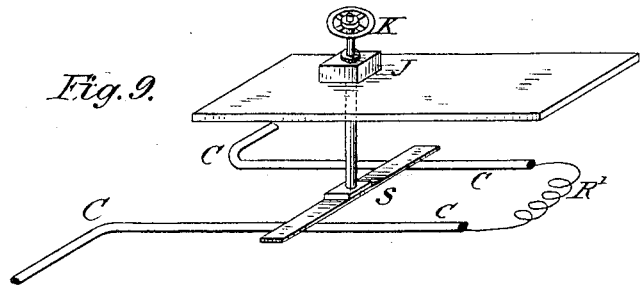
Figure 10:
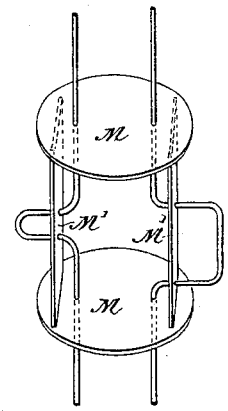

In the accompanying drawings, Figure 1 is a perspective view of a conduit embodying my invention. Fig. 2 shows my improved surface underground conduit applied to the entire surface of a street or roadway. Fig. 3 is a perspective view of a lid for the conduit. Fig. 4 shows a lid applied to the conduit. Fig. 5 is a perspective view showing the accessory conduit with its cover removed. Fig. 6 is a diagram showing the arrangement of the loops from a series of conductors to the tapping-conduit. Fig. 7 shows an improved arrangement of loop-wire. Fig. 8 shows a branch conduit applied to the tapping-conduit. Fig. 9 shows a cut-out for a branch circuit. Fig. 10 shows a novel support for the conductors in the main conduit. Fig. 11 shows said support in place in its conduit.

In Fig. 1 is shown a hollow box or conduit of cast-iron, wood, or other suitable material of any desired shape. The separate wires, having an insulating covering or not, are suitably supported inside this box by any well-known device.

A A, A' A', A² A² represent the hollow box or conduit, made in three parallel sections, in this case rectangular in shape, with their containing-wires.

In A A the wires are laid in parallel layers on beds of pitch run in between them, or otherwise supported or arranged—as, for instance, by frames or supports of insulating material, as is well understood in the art. A frame or support particularly adapted for this purpose will be described further on. In this case I prefer to previously insulate the wires before running in the melted pitch or paraffine.

In A' A' the containing-wires are arranged in vertical rows, supported in any suitable manner by hooks placed on boards or standards.

In connection with the section A² A², I have shown a device that may conveniently be employed for obtaining access to the separate wires in the conduit. This device consists of the parallel accessory tapping trough or pipe B, which may be placed alongside each separate conduit, and is used in the manner to be hereinafter described. The cover or lid of the conduit may be made in any way or of any material that will both adapt it for keeping the moisture from the box and will be suitable for the roadway. I do not limit myself to any particular construction or material for this purpose. Some constructions that answer very well consist of shallow frames or trays of cast-iron filled with blocks of stone or slabs of wood, D' D', Fig. 1; or what will also be found to be well suited for this purpose is to fill the cast-iron frame with artificial stone, or with any sufficiently-hard bituminous concrete. Any desired surface may be given to these covers so as to present sufficient friction to prevent the slipping of horses or other beasts of burden.

A cast-iron frame that serves to receive or hold the material that is to form the wearing-surface of the road-bed is shown in Fig. 3. It is there shown as consisting of a rectangular frame with an imperforate bed-plate, S, and rims or edges R, partially perforated, as at $o$ $o$ $o$ $o$ $o$, to permit the discharge of any water that might enter. A lower flange, H, rests in a groove in the top edge of the conduit after the manner shown in Fig. 4, and prevents the entrance of water thereto. The contiguous sections of the covers to the conduit overlap one another for the same purpose. Any suitable construction may be adopted for this purpose.

I will now describe the use of the accessory tapping-conduit B. This I provide for the purpose of securing ease in making connection with any of a great number of wires in the conduit. In this case any insulating material—such, for example, as a board—is placed, as shown in Figs. 1 and 5, at X Y, so as to divide the rectangular cast-iron box into two compartments. I pass short loops from the conductors through holes in the sides of this partition and prevent them from being pulled out by means of short pins $i$ $i$ $i$ $i$, placed through the loop.

In order to provide for the ready recognition of any particular wire in a number, I arrange these loops so that they will be found in some previously-arranged order. Thus, if the wires are arranged in the conduit in four vertical rows, I cause the loop in any horizontal row to pass through openings made in that part of the partition situated in substantially the same horizontal line, as shown in Figs. 5 and 6. Thus, as is more clearly seen in Fig. 6, where one horizontal row of wires is shown—say, for example, the upper row in any conduit—the wire 1 is shown as forming two loops at any suitable distance apart at 1′ and 1′. The next wire, 2, forms loops that are situated at 2′ 2′, adjoining 1′ and 1′. So, also, the next wires, 3 and 4, form loops at 3′ and 3′ and 4′ and 4′. Where I desire to leave larger loops in the wires, in order to economize the space in B, I pass them through wider slots in X Y and form coils Q′ Q′ Q′ Q′, and secure them in position by pins passing through the coils, as in Fig. 7. The wires placed in the conduits may be either single or suitably insulated and twisted in cables. Where the conduits are intended for telegraph or telephone circuits, I prefer to avoid the effects of induction by the use of the well-known metal-covered insulated wires. This is especially necessary when electric-light circuits are placed in the same or in adjoining conduits, in which case it is advisable that the anti-induction metallic covering be placed in good electrical contact with the ground.

I may either construct my conductor-conduits so as to avoid the entrance of water, or, if I use the accessory conduit B, which I term the "tapping-conduit," I may fill them with any protecting and insulating material, such as melted pitch or paraffine. In this case, since it will seldom be necessary to remove the larger covers D D or D′ D′ of the main conduits, they may be permanently attached to their respective conduits, and B only provided with a readily-removable cover. The tapping-conduit B may be placed in the position shown in Figs. 1 and 5, or, for convenience, the same conduit B may serve for two conduits, in which case it is placed between them.

I may utilize the short loops that are passed from the main conduit A to the accessory or tapping conduit B for the purpose of carrying off branches, so as to enter stores or dwellings, in the manner shown in Fig. 8, where a branch conduit, W, is connected to the accessory conduit B by any suitable joint at the point in the conduit at which it is desired the current shall be supplied. In this case I form an accessory conduit at the end of the branch conduit where it enters the main—as, for example, at Z. This permits me, as before explained, to render the rest of the conduit, as W, impervious to water by filling it with pitch or other suitable insulator.

The conductors C C may be passed through any insulating material in the side of the conduit A, and connected with conductors C′ C′, extending from the branch conduit at $d$ $d$, or, when convenient, may be passed directly into the branch conduit W by pulling the wire into the position shown at C′ C′. Of course this can only be done in the first instance before the insulating material is poured into A. If, as is often the case, the branch connection is to be formed after the conduit A is filled with insulating material, then recourse is had to the accessory conduit B and its loops, which are then connected in any suitable manner at $d$ $d$ with the free ends of the conductors in the branch conduit W. The free ends of the conductors of the branch conduits are thoroughly insulated, so as to prevent any injury being done by entrance of moisture. I sometimes place over the curb or in other suitable position—it may be in the branch conduits—a cut-out, S, Fig. 9, which cuts out the branch C C R. This cut-out is worked by means of a screw-key, K, which is mounted in a box, J, on the conduit, and moves the strip S to or from the conductors C C.

In order to provide for the excavation of the street or road-bed under the conduits, I sometimes build light arches of masonry or brickwork, or I form the conduits in suitably-jointed sections, so as to permit of their ready removal.

When the conductors to be placed in my conduits are insulated by being passed through perforated buttons or rings of porcelain, glass, or other solid insulating material, I provide for loops being readily taken out therefrom, in order to connect with the tapping-conduit B, by the construction of the porcelain insulators, shown in Figs. 10 and 11, consisting of a disk or button of porcelain, M, or other suitable material, provided with ears or lugs M' M', furnished with one or two holes, as shown, for the loop-wire. In the use of these conduits for electric-light wires I have found heavy copper wire suitably insulated and protected by a coating of lead to answer admirably. Such wire may be protected by a coating of pitch, after being placed in the conduit, in all cases when it is not desired to avoid the effects of induction. When this, however, is necessary in order to prevent any injury to the soft coating of lead, I coat it by an electrically-deposited layer of copper or iron, and thus preserve the electrical conducting power of the metallic covering.

What I claim as my invention is—

1. The combination, with an underground conduit, of a lid composed of an imperforate bed-plate having a perforated raised edge.

2. The combination, with a main or principal conduit for electric conductors, of a parallel accessory tapping-conduit, said main conduit being constructed to permit access to the conductors therein from the tapping-conduit, as and for the purpose described.

3. The combination, with an underground conduit containing a series of electric conductors embedded in insulating material, of a parallel hollow tapping conduit or trough, and connections from the conductors in said underground conduit, to permit connection to be made with wires in the tapping-conduit.

4. The combination, with the underground conduit, of the parallel tapping-conduit, separated therefrom by the partition, and the loop-wires passing through said partition.

5. The combination of the main conduit containing the insulated wires, exposed by means of loops or otherwise, so as to permit connection to be made with them through the wall of said conduit, the parallel tapping-conduit, and the branch conduit connected to the latter.

6. The combination, with the perforated disk or plate M, of the perforated plate M', at right angles thereto, serving as a support for the loop of the conductor support by M.

7. The combination, with the conductors contained in a sealed conduit, of loops or branches taken through the wall of the conduit from said conductors at various intervals longitudinally and in uniform succession.

8. The combination, with the conductors contained in a sealed conduit and arranged parallel to one another in a number of planes, of loop-connections from each set of conductors in the same horizontal plane, carried through the wall of the sealed conduit at points in the same horizontal line, and in regular or uniform succession with relation to said conductors.

Signed at Philadelphia, in the county of Philadelphia and State of Pennsylvania, this 29th day of December, A. D. 1882.

EDWIN J. HOUSTON.

Witnesses:
C. HOWARD COLKET,
HOWARD T. JEFFERIS.